(12) United States Patent
Berenger

(10) Patent No.: US 7,538,521 B2
(45) Date of Patent: May 26, 2009

(54) ELECTRICAL POWER SUPPLY ARRANGEMENT FOR AN AIRCRAFT

(75) Inventor: Serge Berenger, Chevilly Larue (FR)

(73) Assignee: Hispano Suiza, Colombes (FR)

( * ) Notice: Subject to any disclaimer, the term of this patent is extended or adjusted under 35 U.S.C. 154(b) by 222 days.

(21) Appl. No.: 11/743,910

(22) Filed: May 3, 2007

(65) Prior Publication Data

US 2007/0257558 A1    Nov. 8, 2007

(30) Foreign Application Priority Data

May 5, 2006    (FR) .................................. 06 51638

(51) Int. Cl.
*H02P 9/10* (2006.01)
(52) U.S. Cl. .............................. 322/25; 322/22; 322/24; 322/23; 322/36
(58) Field of Classification Search .................. 322/22, 322/23, 24, 25, 28, 36, 59, 99
See application file for complete search history.

(56) References Cited

U.S. PATENT DOCUMENTS

| 5,233,286 | A |   | 8/1993 | Rozman et al. |   |
|---|---|---|---|---|---|
| 5,929,537 | A |   | 7/1999 | Glennon |   |
| 7,064,524 | B2 | * | 6/2006 | Yao | ............................. 322/25 |
| 7,161,330 | B2 | * | 1/2007 | Velhner et al. | ................ 322/75 |
| 7,183,747 | B2 | * | 2/2007 | Kleineberg et al. | ......... 320/132 |
| 7,196,497 | B2 | * | 3/2007 | Ooiwa | ......................... 322/22 |
| 2006/0044722 | A1 |   | 3/2006 | Wavering et al. |   |
| 2006/0061213 | A1 |   | 3/2006 | Michalko |   |

* cited by examiner

*Primary Examiner*—Nicholas Ponomarenko
*Assistant Examiner*—Iraj A Mohandesi
(74) *Attorney, Agent, or Firm*—Oblon, Spivak, McClelland, Maier & Neustadt, P.C.

(57) ABSTRACT

An arrangement for electrically powering an aircraft comprises at least one first generator driven by an engine of the aircraft, an electricity network on board the aircraft receiving the voltage produced by the first generator, at least one second generator driven by the motor, and an engine electrical network distinct from the on-board network for powering equipment of the engine of its environment, the engine network comprising:
  at least one DC electrical voltage distribution bus for the electrical equipment; and
  a power supply circuit having a first input connected to the on-board network, a second input connected to the second generator to receive the electrical voltage supplied thereby, a voltage converter connected to the second input, and a selector circuit for delivering a voltage on the distribution bus, the voltage being supplied from that received on the first input or from that supplied by the converter depending on the amplitude of the voltage supplied by the second electricity generator.

11 Claims, 3 Drawing Sheets

ELECTRICAL POWER SUPPLY ARRANGEMENT FOR AN AIRCRAFT

BACKGROUND OF THE INVENTION

The invention relates to supplying electrical power to an aircraft, and more particularly to electrical equipment of an aircraft engine and/or of its environment.

The field of application of the invention is more specifically that of airplane engines, in particular gas turbine engines. Nevertheless, the invention is also applicable to helicopter engines.

The term "electrical equipment of an aircraft engine or of its environment" is used herein to mean not only electrical equipment useful for the actual operation of the engine, but also electrical equipment associated with the engine pod, such as, for example: electrical circuits for de-icing, or electromechanical actuators for reversing thrust on gas turbine airplane engines; or even equipment associated with the wing carrying the engine, such as, for example: de-icing or anti-icing electrical circuits for the airplane wing.

A traditional layout for producing and distributing electricity from a gas turbine airplane engine is shown in FIG. 1.

Two generators 1, 1' (or more than two for redundancy purposes or for optimizing the generation of electrical power depending on the application in question) are mounted on an accessory gearbox (AGB) that is mechanically coupled to a turbine shaft of the engine. The generators are typically starter/generators (S/Gs) comprising a synchronous generator that is associated with an exciter and that supplies an alternating voltage at a frequency that varies as a function of the speed of the engine, the assembly comprising the exciter and the synchronous generator being controlled to operate in synchronous motor mode when starting the turbine.

The alternating voltages supplied by the generators 1, 1' are conveyed by lines 2, 2' to an electrical power distribution network 3 on board the airplane, referred to as the "on-board network". A circuit 4 of the on-board network connected to the lines 2, 2' supplies a regulated alternating voltage typically of 115 volts AC (Vac) or 230 Vac, on one or more distribution buses. The circuit 4 also powers a voltage converter 5 that delivers a regulated direct current (DC) voltage, typically 270 Vdc or ±270 Vdc, on one or more buses. The voltages supplied by the circuits 4 and 5 are fed to the various electrical loads on board the airplane, mainly in the fuselage zone.

In the engine, an electronic engine control unit 6 (ECU) is powered by a generator 7 such as a permanent magnet alternator (PMA) mounted on the accessory gearbox (AGB). The ECU is also connected to one of the buses 4, 5, e.g. to the regulated alternating voltage bus 4 in order to be powered properly so long as the speed of the engine is not sufficiently fast to enable the PMA to supply the required electrical power, or in the event of the PMA failing. The ECU uses the electricity it receives to enable its components to operate and to excite the various elements of the engine that require limited amounts of electrical power such as probes or sensors, actuators, or servo-valves.

There is a present trend to replace hydraulic power more and more with electrical power for actuating various pieces of equipment in an aircraft engine or its environment. Thus, some airplanes are fitted with thrust reversers that are electrically actuated, such that an electrical power supply line 8 must connect the on-board network 3 of the airplane to such an electric thrust reverser 9. Such a line is in addition to those needed for powering static equipment, such as lines 10, 11 for powering de-icing circuits 12, 13 of the engine pod and of the wing carrying the engine.

Conveying electricity from the on-board network to loads outside the fuselage by means of lines that must be carefully secured and insulated represents a considerable amount of weight and bulk, running the risk of becoming ruling dimensions, or even of being excessive if the amount of equipment to be powered increases.

OBJECT AND SUMMARY OF THE INVENTION

An object of the invention is to provide an electricity power supply arrangement that does not present such a drawback and that enables a large amount of electrical equipment to be powered in an aircraft engine and/or in its environment.

This object is achieved by an arrangement for electrically powering an aircraft, the arrangement comprising:

at least one first generator supplying an electrical voltage on being driven by an engine of the aircraft;

an electrical power distribution network on board the aircraft connected to the first generator via a power supply line to receive the electrical voltage produced by the first generator;

at least one second generator supplying an electrical voltage on being driven by an engine of the aircraft; and an electrical power distribution network of the aircraft engine that is distinct from the on-board network and that serves to supply electrical power to electrical equipment situated in the aircraft engine and/or in the environment of the engine, the engine network comprising:

at least one bus for distributing DC electrical voltage for the electrical equipment; and a power supply circuit having a first input connected to the on-board network to receive a voltage supplied by the on-board network, a second input connected to the second generator to receive the electrical voltage supplied thereby, a voltage converter connected to the second input, and a selector circuit for delivering a voltage over the distribution bus, which voltage is supplied from the voltage received on the first input, or is supplied by the converter, depending on the amplitude of the voltage supplied by the second generator.

The arrangement of the invention thus makes it possible to provide a node at which the availability of electrical power is secure and located at an engine in order to power loads integrated in the engine or situated in its proximity, with a single connection to the on-board network of the aircraft sufficing to ensure that electricity is available on the electrical network of the engine when the second generator does not suffice to cover requirements. The second generator supplies an electrical voltage that is regulated or variable depending on engine speed. The second generator may be a permanent magnet alternator. The power supply circuit may also include a voltage converter connected to the first input in order to convert the voltage supplied by the on-board network, in particular when said voltage is an alternating voltage.

At least one set of modules with inverters powered by the DC distribution bus can be provided for delivering alternating voltage to electrical equipment. The voltage distribution bus of the engine network may be a regulated DC distribution bus.

For redundancy or installation-optimization purposes, the power supply arrangement may include two second generators driven by the engine and respectively connected to the second input and to the third input of the power supply circuit, and two voltage distribution buses connected to a first output and to a second output of the power supply arrangement, and the power supply circuit further includes a voltage converter connected to the third input, the voltage converters connected to the second and third inputs being connected respectively to the first output and to the second output. Under such circumstances, and preferably, the first input is connected to the first and second outputs of the power supply circuit, the selector circuit enabling the first and second distribution buses to be supplied with voltages supplied respectively by the converters connected to the second input and to the third input, or to supply them with the voltage supplied by the first converter.

The electrical equipment may include electromechanical actuators for parts of the engine that are of variable geometry, and electric motors for pumps, and also at least one circuit for de-icing an engine pod. With an airplane engine, the electrical equipment may include at least one circuit for de-icing the wing supporting the engine, and with a gas turbine airplane engine, it may include electrically-actuated electromechanical actuators for a thrust reverser.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS OF THE INVENTION

Figure 1:
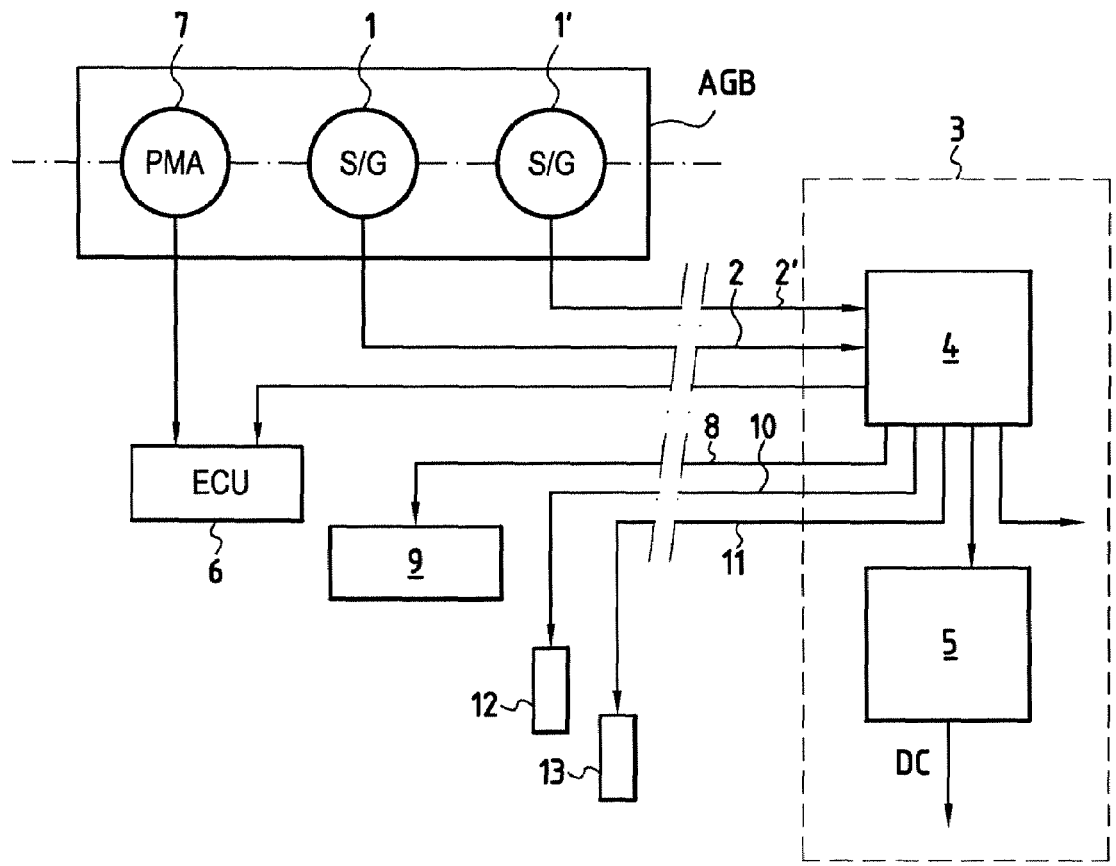
FIG. 1, described above, is a highly diagrammatic representation of a known scheme for producing and distributing electricity in an aircraft.
Figure 2:
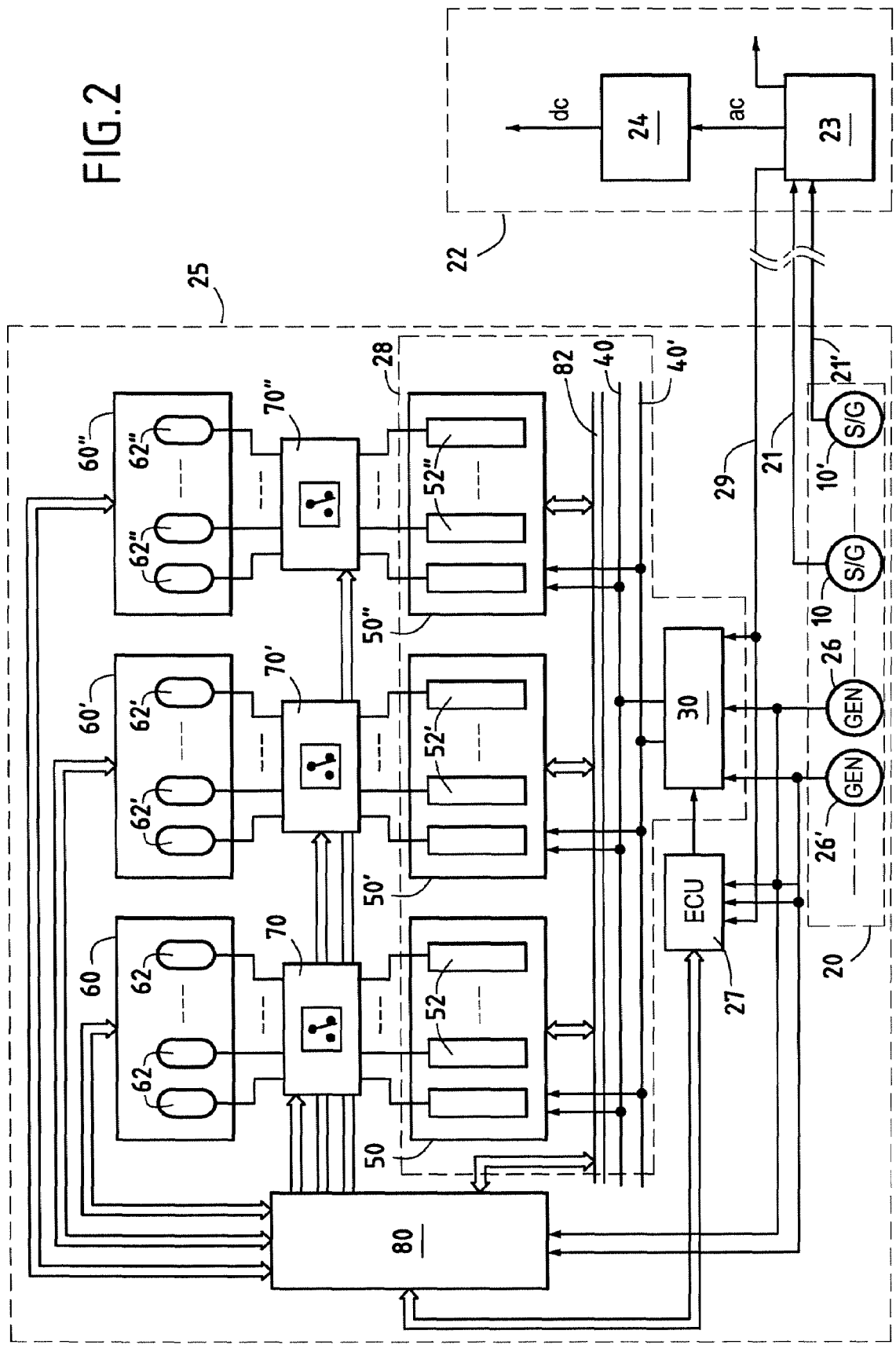
FIG. 2 is a highly diagrammatic general view showing a system for electrically powering and controlling equipment of an aircraft engine and of its environment.

FIG. 2 is a general scheme for a system for electrically powering and controlling electrical equipment of an aircraft engine and of its environment, in particular for a gas turbine airplane engine.

In conventional manner, the circuit of FIG. 2 comprises one or two first generators 10, 10' such as S/Gs mounted in a gearbox (represented by 20) that is mechanically coupled to a turbine shaft of the engine. The alternating voltages supplied by the SIGs 10 and 10' are conveyed by lines 21 and 21' to a network 22 for distributing electrical power on board the airplane, referred to as an on-board network. A circuit 23 of the on-board network 22 supplies an alternating voltage (typically regulated on 115 Vac or 230 Vac) to one or more distribution buses, the frequency of the AC varying as a function of the speed of rotation of the turbine shaft. The circuit 23 also powers a voltage converter circuit 24 that supplies a regulated DC voltage (typically on 270 Vdc or ±270 Vdc) to one or more buses. The voltages produced by the circuits 23 and 24 power various loads in the fuselage zone of the airplane.

At the engine (represented by 25), two second generators (GEN) 26, 26', such as PMAs, for example, supply alternating voltage that is regulated or variable depending on the speed of the engine to an electronic engine control unit (ECU) 27, and also to a secure power supply circuit 30 forming part of an electrical power distribution network 28 integrated in the engine. The network 28, referred to as an engine network, is situated at the engine and is distinct from the on-board network 22. The ECU 27 and the power supply arrangement 30 are also connected to the alternating voltage circuit 23 via a line 29 so that they can be powered properly when the engine has not reached a speed that is sufficient to enable the generators 26 and 26' to supply the required amount of electrical power.

The power supply circuit 30 supplies a DC voltage on two DC distribution buses such as HVDC buses 40, 40' of the engine network 28 that power a system for powering and controlling electrical equipment of the engine and/or of its environment.

The power supply and control system comprises power supply modules that may, for example, be distributed in a plurality of sets 50, 50', 50" associated with respective groups 60, 60', 60" of pieces of electrical equipment 62, 62', 62" via respective selector circuits 70, 70', 70". The electrical equipment comprises in particular: electric motors for pumps; actuators for parts of the airplane engine that are of variable geometry, or for thrust reversers, or for electrically-actuated inspection hatches; and de-icing or anti-icing resistive circuits; with all said pieces of equipment forming part of the airplane engine or of its environment (pod, support pylon, nearby wing).

The power supply modules 52, 52', and 52" of the sets 50, 50', 50" and the selector circuits 70, 70', 70" are controlled by a control device comprising a central control unit 80. The unit is connected by sets of lines 64, 64', 64" to sensors associated with at least certain pieces of electrical equipment in the groups 60, 60', 60" and it is also connected to the ECU 27. The components of the central control unit 80 are powered by the generators 26, 26' in the same manner as for the components of the ECU 27. The power supply modules 52, 52', 52" comprise inverters for delivering alternating voltage to the equipment 62, 62', 62" of the groups 60, 60', 60", which AC voltage is derived from the DC voltage delivered by the buses 40, 40'. The central control unit 80 controls the modules 52, 52', 52" and the selector circuits 70, 70', 70" so that each of the pieces of equipment 62, 62', 62" is activated as a function of information received from the ECU 27 and/or from sensors associated with the equipment. When a piece of equipment is said herein to be "activated", it should be understood in particular that an electric motor is caused to run, that an electrical or an electromechanical actuator is set into movement, or that a resistive heater circuit is powered.

The power supply modules of each set are similar, with the modules being subdivided into various sets and the pieces of equipment being grouped into various groups as a function of the powers required, so as to optimize the sizes of the inverters and of the power supply modules. In the example shown, the number of sets of modules and the number of groups of equipment is three. Naturally, the number could be other than three, and it could even equal to one if the inverters used present enough power for all of the equipment. Each set of modules may include at least one emergency module for redundancy purposes. The selector circuits 70, 70', 70" are controlled so as to connect each piece of equipment of a group to a module of the set that corresponds to the group, possibly the emergency module, where necessary.

Other systems for powering and controlling equipment of an airplane engine or of its environment could be designed making use of the energy supplied via the buses 40, 40' by the secure power supply circuit 30. Thus, at least some of the equipment could be powered with the DC voltage from the buses 40, 40' or with a DC voltage derived therefrom.

Figure 3:
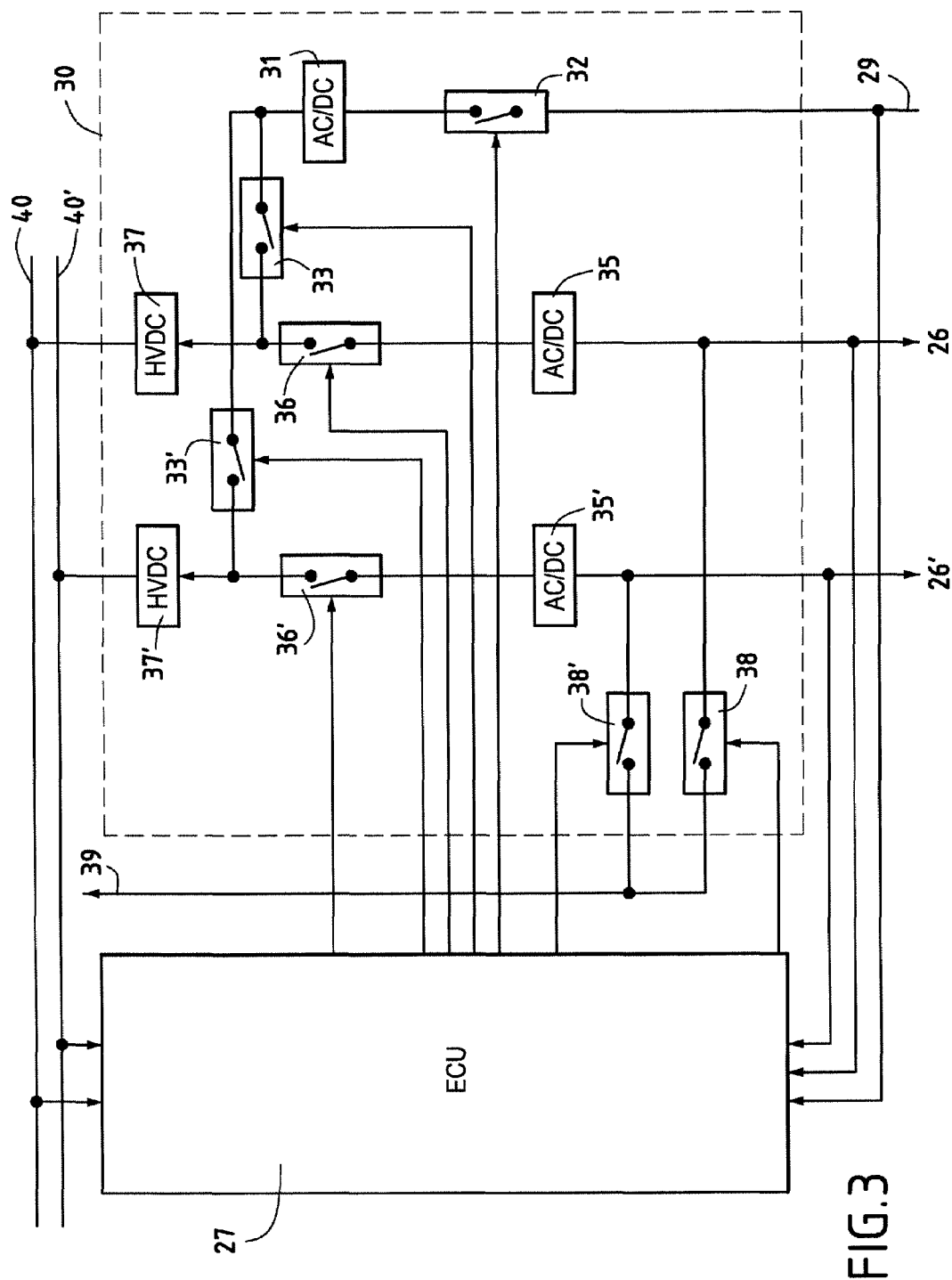
FIG. 3 is a more detailed view of a circuit for supplying an electrical voltage that forms part of the engine electrical network of FIG. 2.

FIG. 3 shows in greater detail the secure power supply circuit 30. An AC/DC converter circuit 31 has its input connected via a switch 32 to a first input of the circuit 30 that is connected to the line 16. Two other AC/DC converter circuits 35, 35, have their inputs connected respectively to second and third inputs of the circuit 30 receiving the respective alternating voltages from the generators 26, 26'. The outputs from the converters 35, 35' are connected respectively via switches 36, 36' to DC bus circuits 37, 37', e.g. of the HVDC type respectively powering the buses 40, 40'. The output from the converter 31 is also connected to the circuits 37, 37' via respective switches 33, 33'.

The selector circuit formed by the switches 32, 33, 33', 37, 37', is controlled by the ECU 27 as a function of the voltage levels detected at the outputs from the generators 26, 26'. When the generators are supplying sufficient electrical power, the switches 36, 36' are closed and the switches 32, 33, 33' are open. The electrical power available on the buses 40, 40', is taken from that supplied by the generators 26, 26', respectively. When one and/or the other of the generators 26, 26' supplies insufficient power while the airplane engine is operating slowly or in the event of a failure, the ECU 27 causes the switch 36 and/or the switch 36' to be opened, while simultaneously causing the switch 32 and also the switch 33 and/or the switch 33' to be closed. The electrical power available on the buses 40, 40' is then taken from that supplied by one of the generators and from the line 29, or solely from that supplied by the line 29. Thus, with the power supply circuit 30, a secure electrical power supply node is made available at the engine, enabling an engine network to be established with buses 40, 40', i.e. a local network 28 that is dedicated to the engine and to its environment and that is distinct from the on-board network 22. The buses 40, 40' power the sets of modules 50, 50', 50'' and also the central control unit 80 for activating the electrical equipment 62, 62', 62''. Nevertheless, it is also possible to power one or more pieces of electrical equipment directly from the output of the generators 26, 26', e.g. a circuit for de-icing the engine pod or the wing that is connected to a line 39 in turn connected to the outputs of the generators 26, 26' via respective switches 38, 38'. The switches 38, 38' are controlled by the ECU 27 to power the line 39 as a function of requirements.

The use of two buses 40, 40' that are separately powered makes it possible to mitigate failure of a bus or of its power supply, and to share the distributed DC electricity.

The use of two second generators 26, 26' makes it possible to mitigate the failure of one generator while conserving a secure power supply via the link 29 with the on-board network and to share the electrical power supplied. The use of a single second generator powering the two buses 40, 40' in parallel could nevertheless be envisaged.

It is also possible to envisage the presence of a single electrical power supply bus powered in parallel from two generators or from a single generator, and where appropriate the on-board network.

The DC voltage supplied on the buses 40, 40' may present a regulated voltage, e.g. having a nominal value of 270 Vdc or ±270 Vdc, with the regulation being performed by the AC/DC converter circuit.

In a variant, the DC voltage supplied on the buses 40, 40', need not be regulated, with a range of variation around a nominal value then being tolerated, in particular as a function of variations in the voltages supplied by the generators 26, 26'.

In the embodiment described above, the voltage of the on-board network that is available, where necessary, for the power supply circuit 30 is an alternating voltage. This voltage could be a DC voltage, in which case AC/DC conversion would not be needed at the power supply circuit 30. The converter 31 could then be omitted or replaced by a DC/DC converter if the DC voltage to be delivered on the buses 40, 40' is different from that of the on-board network.

In the embodiment described above, the electrical power supply arrangement is specially for airplanes fitted with gas turbine engines. Nevertheless, the invention is applicable to other types of aircraft, and in particular to helicopters, and to other types of engine.

What is claimed is:

1. An arrangement for electrically powering an aircraft, the arrangement comprising:
    at least one first generator supplying an electrical voltage on being driven by an engine of the aircraft;
    an electrical power distribution network on board the aircraft connected to the first generator via a power supply line to receive the electrical voltage produced by the first generator;
    at least one second generator supplying an electrical voltage on being driven by an engine of the aircraft; and
    an electrical power distribution network of the aircraft engine that is distinct from the on-board network and that serves to supply electrical power to electrical equipment situated in the aircraft engine and/or in the environment of the engine, the engine network comprising:
        at least one bus for distributing DC electrical voltage for the electrical equipment; and
        a power supply circuit having a first input connected to the on-board network to receive a voltage supplied by the on-board network, a second input connected to the second generator to receive the electrical voltage supplied thereby, a voltage converter connected to the second input, and a selector circuit for delivering a voltage over the distribution bus, which voltage is supplied from the voltage received on the first input, or is supplied by the converter, depending on the amplitude of the voltage supplied by the second generator.

2. An arrangement according to claim 1, wherein the power supply circuit of the engine network further includes a voltage converter connected to the first input to convert the voltage supplied by the on-board network.

3. An arrangement according to claim 1, wherein the voltage distribution bus of the engine network is a regulated DC voltage distribution bus.

4. An arrangement according to claim 1, wherein at least one set of modules is provided with inverters powered by the DC voltage distribution bus, and delivering an alternating voltage to the electrical equipment.

5. An arrangement according to claim 1, having two second electricity generators driven by the engine and respectively connected to the second input and to the third input of the power supply circuit, and two voltage distribution buses connected to a first output and to a second output of the power supply arrangement, and the power supply circuit further includes a voltage converter connected to the third input, the voltage converters connected to the second and third inputs being connected respectively to the first output and to the second output.

6. An arrangement according to claim 5, wherein the first input is connected to the first and second outputs of the power supply circuit, the selector circuit serving to supply voltages on the first and second distribution buses, which voltages are supplied respectively by the converters connected to the second and third inputs, or from the voltage received on the first input.

7. An arrangement according to claim 1, wherein the, or each, second generator is a permanent magnet alternator.

8. An arrangement according to claim 1, wherein the electrical equipment includes electromechanical actuators for parts of the engine that are of variable geometry, and electric motors for pumps.

9. An arrangement according to claim 1, wherein the electrical equipment includes at least one circuit for de-icing the engine pod.

10. An arrangement according to claim 1, for an airplane engine, wherein the electrical equipment includes at least one circuit for de-icing the wing supporting the engine.

11. An arrangement according to claim 1, for a gas turbine airplane engine, wherein the electrical equipment includes electrically actuated electromechanical actuators of a thrust reverser.

* * * * *